US005936177A

United States Patent [19]

Shigenaga

[11] Patent Number: 5,936,177
[45] Date of Patent: Aug. 10, 1999

[54] FOOT PEDAL FOR DRUM SET

[75] Inventor: Fumihiro Shigenaga, Hamamatsu, Japan

[73] Assignee: Yamaha Corporation, Japan

[21] Appl. No.: 08/899,985

[22] Filed: Jul. 24, 1997

[30] Foreign Application Priority Data

Jul. 25, 1996 [JP] Japan .................................... 8-196085

[51] Int. Cl.$^{6}$ ..................................................... G01D 13/02
[52] U.S. Cl. ............................................................ 84/422.1
[58] Field of Search ............................................. 84/422.1

[56] References Cited

U.S. PATENT DOCUMENTS

| | | | |
|---|---|---|---|
| 2,672,784 | 3/1954 | Sabo | 84/422.1 |
| 2,800,828 | 7/1957 | Moeller | 84/422.1 |
| 4,346,638 | 8/1982 | Hoshino | 84/422.1 |
| 5,458,038 | 10/1995 | Kurosaki | 84/422.1 |

FOREIGN PATENT DOCUMENTS 58-43035 9/1983 Japan .

*Primary Examiner*—William M. Shoop, Jr.
*Assistant Examiner*—Shih-yung Hsien
*Attorney, Agent, or Firm*—Ostrolenk, Faber, Gerb & Soffen, LLP

[57] ABSTRACT

A foot pedal for a drum set such as a bass drum is constructed using a pedal frame which contains a frame body and two support members. Herein, the two support members project upwardly from both ends of the frame body. A rotation shaft is rotatably supported by beating portions which are provided at upper end portions of the two support members respectively. A foot board is provided for the pedal frame and is operated in response to step force applied thereto. A rocker is fixed to a selected position of the rotation shaft and is equipped with a beater by means of a beater rod. So, when a person depresses the foot pedal by a foot, step force applied to the foot pedal is transmitted to the rocker by means of a step force transmission member such as a chain, so that the rocker rotates together with the rotation shaft. In response to rotation of the rocker, the beater strikes a drum head of the bass drum. A spacing member links lower ends of the bearing portions together beneath the rotation shaft so as to reinforce the two support members. Thanks to provision of the spacing member, it is possible to prevent flexure from occurring on the support members in a horizontal direction when the foot board is depressed. Further, a cutting channel is formed to partially cut the rocker. The cutting channel has an arc-like shape formed about a center of rotation of the rocker so as to avoid interference between the rocker and spacing member while the rocker rotates.

5 Claims, 4 Drawing Sheets

FOOT PEDAL FOR DRUM SET

BACKGROUND OF THE INVENTION

1. Field of the Invention

This invention relates to foot pedals which are operated by human feet to rotate beaters to strike drum heads of bass drums provided in drum sets.

2. Prior Art

Conventionally, various kinds of foot pedals are proposed and used for drum sets. An example of the foot pedal is disclosed by the paper of Japanese Utility-Model Publication No. 58-43035. The foot pedal is designed in such a way that a foot board thereof is depressed by a human foot to rotate a beater, which strikes a drum head of a bass drum.

FIG. 4 is a perspective side view illustrating an example of the foot pedal for the drum set conventionally known. Herein, a foot pedal 1 provides a pedal frame 2 made of metal materials such as aluminum alloy. The pedal frame 2 is manufactured by the die casting technique. The pedal frame 2 contains a frame body 2A and two support members 2B. Herein, the support members 2B are formed as incorporative parts of the frame body 2A, wherein they are planted onto both ends of the frame body 2A respectively. A heel 3 is connected to the frame body 2A by means of a connection member 4. Clamp metal fittings 5 are fixed to an upper face of the frame body 2A. The clamp metal fittings 5 are provided to securely fix a clamping frame (or hoop; not shown) of a bass drum. Bearing portions 8 to which bearings 7 are attached are formed at upper end portions of the two support members 2B. Ends of a rotation shaft 6 are rotatably supported by the bearings 7. A rocker 9 is fixed to a center portion of the rotation shaft 6. A beater 10 which strikes (or beats) a drum head is connected to the rocker 9 by means of a beater rod 11. A first end of a step force transmission member 13 is fixed to the rocker 9. Now, a person steps on the foot board 12 or depresses it by his or her foot, so that step force is imparted to the foot pedal 12. The step force transmission member 13 is provided to transmit the step force of the foot board 12 to the beater 10. As the step force transmission member 13, it is possible to use the materials having plasticity such as leather and resin-treated band, for example. Instead of those materials, it is possible to use a timing belt, a chain and the like. The foot board 12 is formed in a flat-plate shape having an area which is sufficient for a person to put on the sole of his or her foot. A front end of the foot board 12 is connected to a second end of the step force transmission member 13, whilst a back end is rotatably connected to the heel 3. One end of the rotation shaft 6 is connected to an upper end of a return spring 14 by means of a cam plate 15. The return spring 14 gives restoration behavior to the foot board 12 so that the foot board 12 is lifted upwardly. A lower end of the return spring 14 is connected to a spring bearing member 16 which is fixed to one of the support members 2B.

When performing a step operation on the foot board 12 of the foot pedal 1 whose construction is described above in conjunction with FIG. 4, the step force transmission member 13 moves downwardly, so that the beater 10 rotates together with the rotation shaft 6. Thus, the beater 10 strikes the drum head of the bass drum. Herein, a maximum step angle by which the step board 12 rotatably moves in a downward direction is 15° or so. After the striking, when step force is released from the foot board 12, the foot board 12 is lifted upwardly by spring force of the return spring 14. So, the foot board 12 is restored to an initial state shown in FIG. 4.

In the foot pedal 1 shown in FIG. 4, when the step force transmission member 13 is moved up and down by performing a step operation on the foot board 12, upward/downward force works at a center portion of the rotation shaft 6 so that the rotation shaft 6 is partially bent to form flexure. Accordingly, flexure occurs on the upper-end portions of the support members 2B. Thus, there is a problem that the rotation shaft 6 deviates in an axial direction. When such an axial deviation occurs on the rotation shaft 6, the rotation shaft 6 does not contact with the bearings 7 in an uniform manner; in other words, the rotation shaft 6 contacts with the bearings 7 in a biased manner. Such a biased contact which occurs between the rotation shaft 6 and the bearings 7 is not preferable for the drum set because it prevents the rotation shaft 6 from being placed in a smooth rotation, or it causes noise. To avoid such a disadvantage, it may be possible to increase rigidity of the rotation shaft 6 as well as rigidity of the support members 2B. However, such an increase of the rigidity causes an increase of weight of the drum set as a whole. So, there is another disadvantage that the drum set is hard to be brought by human power.

SUMMARY OF THE INVENTION

It is an object of the invention to provide a foot pedal for a drum set which is capable of preventing flexure from occurring on a pedal frame due to step operation of a boot board and which is capable of realizing a smooth rotation of a rotation shaft without being affected by step operation of a foot board.

A foot pedal for a drum set according to this invention is constructed using a pedal frame which contains a frame body and two support members. Herein, the two support members project upwardly from both ends of the frame body. A rotation shaft is rotatably supported by beating portions which are provided at upper end portions of the two support members respectively. A foot board is provided for the pedal frame and is operated in response to step force applied thereto. A rocker is fixed to a selected position of the rotation shaft and is equipped with a beater by means of a beater rod. So, when a person depresses the foot pedal by a foot, step force applied to the foot pedal is transmitted to the rocker by means of a step force transmission member, so that the rocker rotates together with the rotation shaft. In response to rotation of the rocker, the beater strikes a drum head of a bass drum.

This invention is characterized by providing a spacing member which links lower ends of the bearing portions together beneath the rotation shaft so as to reinforce the two support members. Thanks to provision of the spacing member, it is possible to prevent flexure from occurring on the support members in a horizontal direction when the foot board is depressed.

Further, a cutting channel is formed to partially cut the rocker. The cutting channel has an arc-like shape formed about a center of rotation of the rocker so as to avoid interference between the rocker and spacing member while the rocker rotates.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENTS

Figure 1:
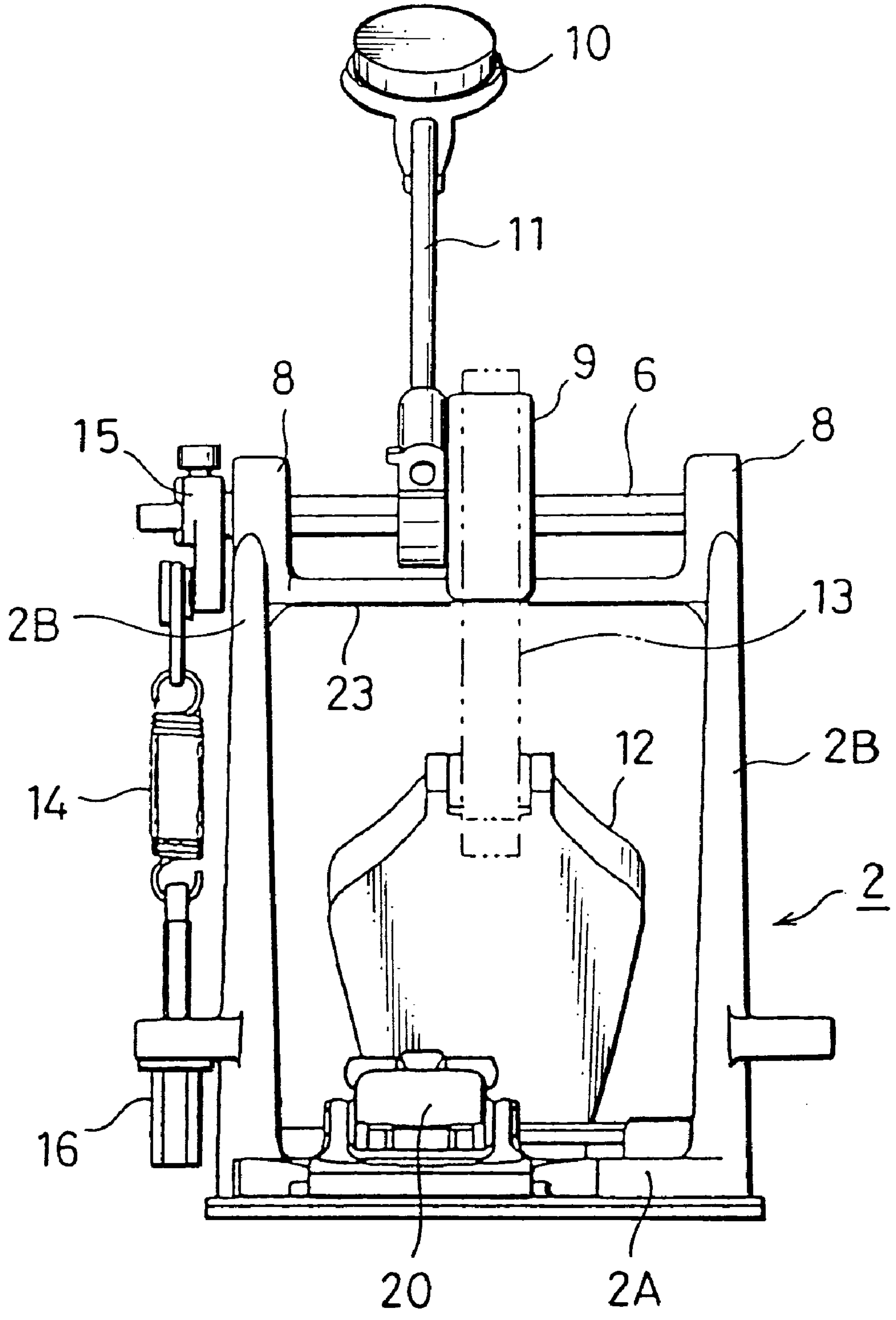
FIG. 1 is a front view illustrating a foot pedal for a drum set which is designed in accordance with an embodiment of the invention.
Figure 2:
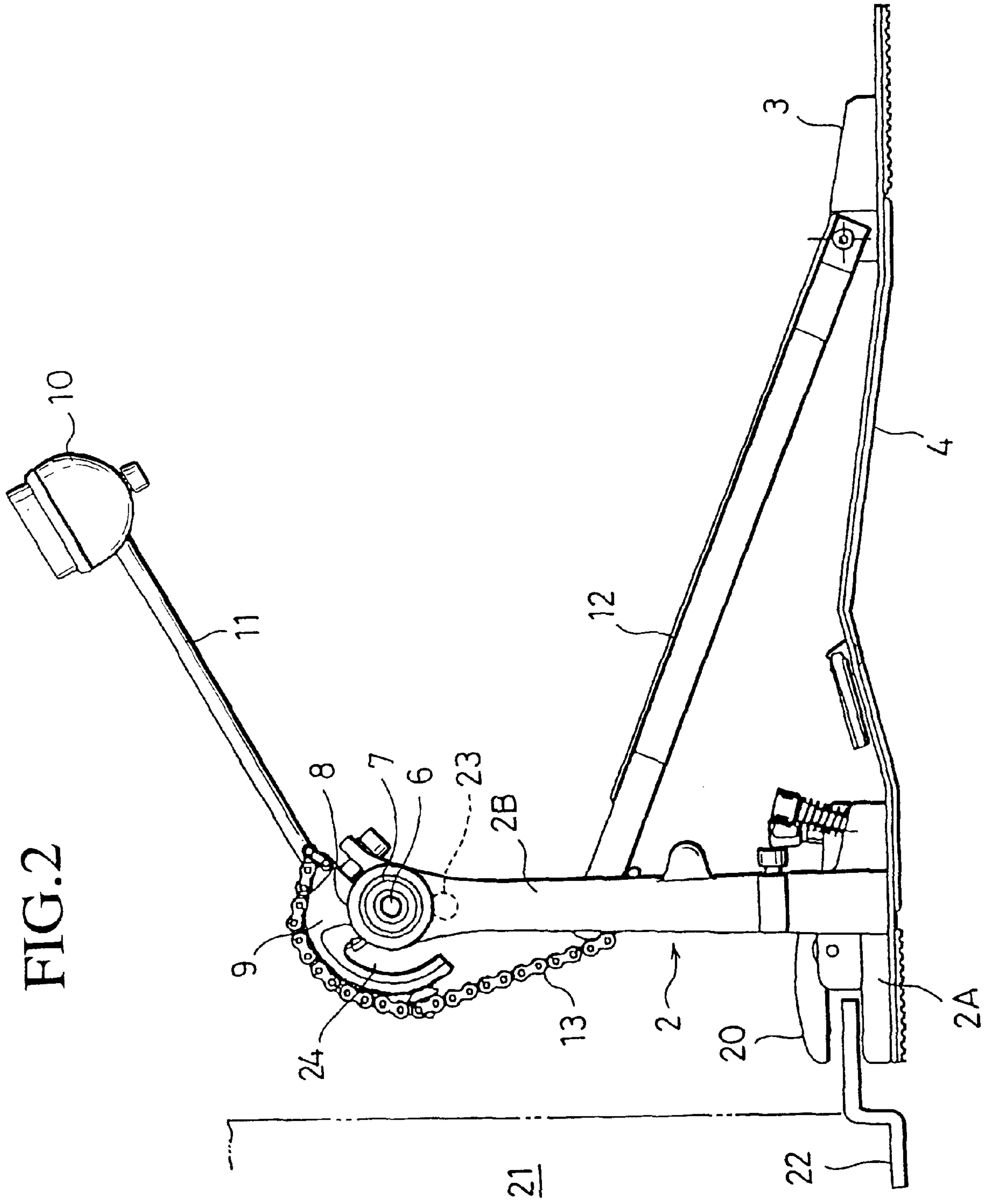
FIG. 2 is a side view illustrating the foot pedal of FIG. 1.
Figure 4:
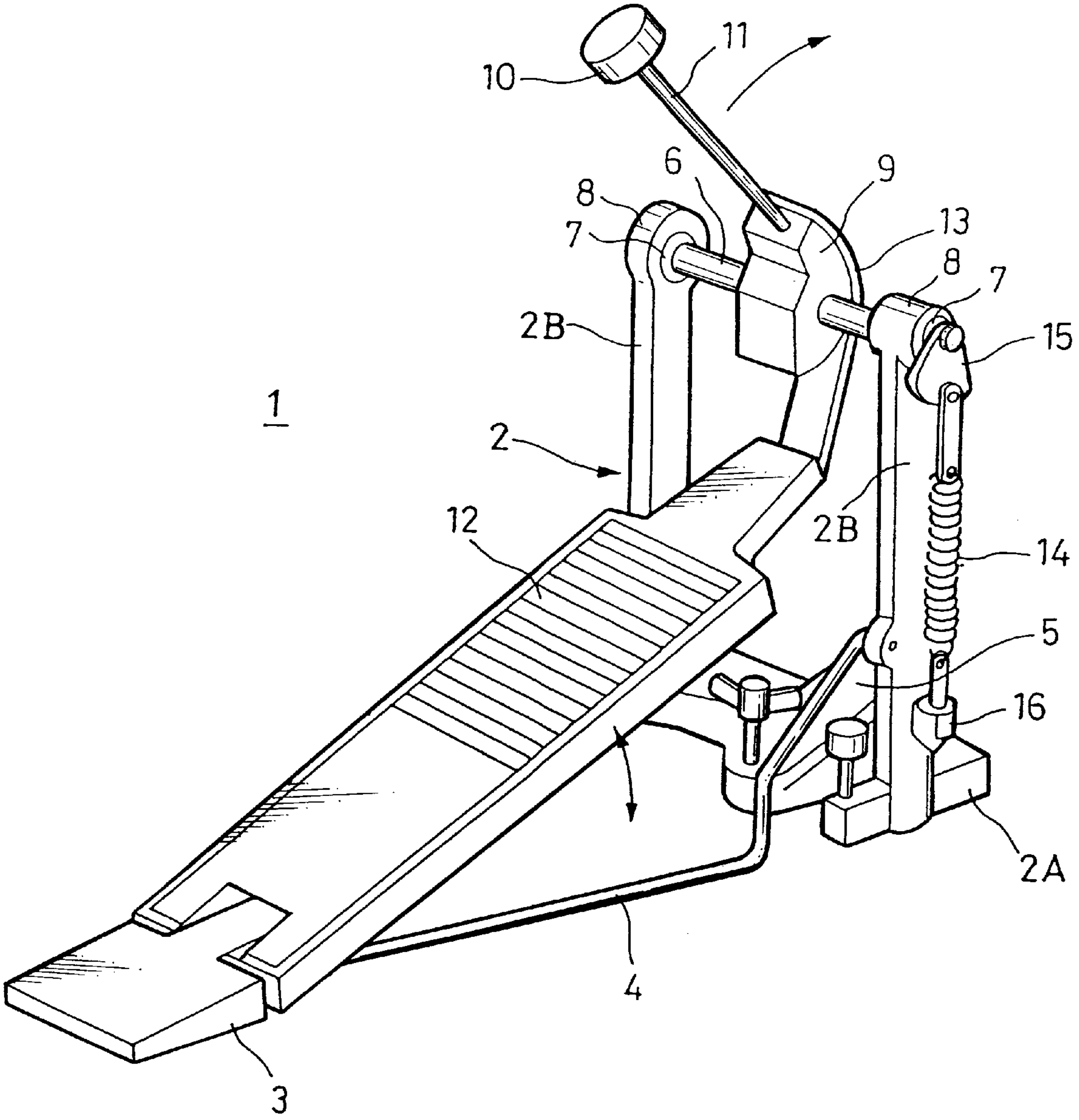
FIG.4 (PRIOR ART)
FIG. 4 is a perspective side view illustrating an example of a foot pedal for a drum set conventionally known.

FIG. 1 is a front view illustrating a foot pedal for a drum set which is designed in accordance with an embodiment of the invention. FIG. 2 is a side view illustrating the foot pedal. In those figures, parts equivalent to those of FIG. 4 are designated by the same numerals; hence, the description thereof will be occasionally omitted.

The present embodiment is characterized by using a chain as the step force transmission member 13 in the foot pedal for the drum set. A clamping metal fitting 20 forces a hoop 22 of a bass drum 21 to press onto an upper face of the frame body 2A. A spacing member 23 links the upper end portions of the two support members 2B together. The spacing member 23 can be formed as an incorporative part of the pedal frame 2. Or, the spacing member 23 can be formed independently of the pedal frame 2. In that case, the spacing member 23 is securely fixed to the support members 2B and is located as shown in FIG. 2 by welding or by screws. It is preferable that the spacing member 23 is located at a height which is close to the upper end portions of the support members 2B which are easily bent. For this reason, lower ends of the bearing portions 8 are linked together; and the spacing member 23 is located within a rotation range of the rocker 9. A cutting channel (or notch channel) 24 is formed by partially cutting the rocker 9 at a surface which faces the spacing member 23. Thanks to provision of the cutting channel 24 of the rocker 9, it is possible to avoid contact (or interference) between the rocker 9 and the spacing member 23. Herein, the cutting channel 24 is a channel having an arc-like shape which is formed about a center of rotation of the rocker 9 or an axial center of the rotation shaft 6. Other parts of the foot pedal of the present embodiment shown in FIGS. 1 and 2 are similar to the aforementioned parts of the conventional foot pedal shown in FIG. 4; hence, the description thereof will be omitted.

According to the construction of the foot pedal for the drum set described above, the upper end portions of the support members 2B are linked together by the spacing member 23. So, it is possible to certainly avoid occurrence of flexure with respect to the support members 2B which are partially bent when a person performs a step operation on the foot board 12. In addition, it is possible to avoid a biased contact which occurs between the bearings 7 and the rotation shaft 6 when the rotation shaft 6 deviates in the axial direction. Further, it is possible to actualize smooth rotation of the rotation shaft 6. As a result, it is possible to improve operating performance of the foot pedal for the drum set.

Thanks to provision of the cutting channel 24, it is possible to avoid contact (or interference) between the rocker and the spacing member 23 during rotation of the rotation shaft 6. In addition, it is possible to make the location of the spacing member 23 to be close to the rotation shaft 6.

Figure 3:
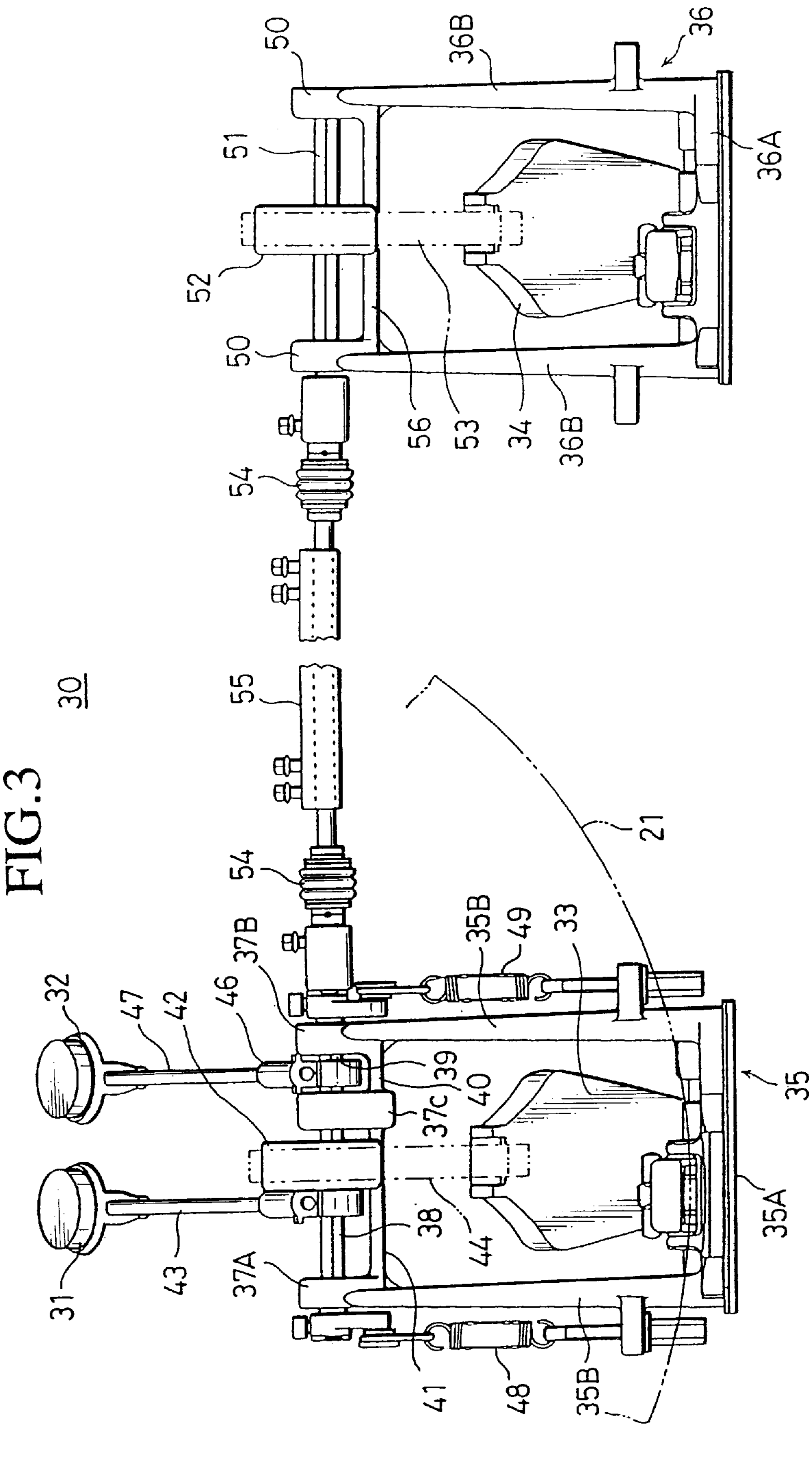
FIG. 3 is a front view illustrating a two-throw foot pedal which is designed in accordance with another embodiment of the invention.

FIG. 3 is a front view illustrating a two-throw foot pedal (or twin foot pedal) 30 which is designed in accordance with another embodiment of the invention. The two-throw foot pedal 30 is constructed to enable speedy and repetitious beating and to bring sophisticated music-performance effects. So, there are provided a first set of a beater 31, a foot board 33 and a pedal frame 35 as well as a second set of a beater 32, a foot board 34 and a pedal frame 36. Herein, the first and second foot boards 33, 34 independently operate the first and second beaters 31, 32; and the first and second foot boards 33, 34 are respectively mounted on the first and second pedal frames 35, 36. The first pedal frame 35 has two support members 35B which are formed as incorporative parts of a frame body 35A. Herein, the support members 35B project upwardly from upper faces of both ends of the frame body 35A. Three bearing portions 37A, 37B and 37C are provided in connection with upper end portions of the support members 35B; and they rotatably support first and second rotation shafts 38, 39. Herein, the bearing portions 37A and 37B are respectively located at the upper end portions of the support members 35B, whilst the bearing portion 37C are located between the bearing portions 37A and 37B in proximity to the bearing portion 37B. A lower end of the bearing portion 37B is linked with the bearing portion 37C by means of a link member 40. In addition, lower ends of the bearing portions 37A and 37C are linked together by means of a spacing member 41.

A rocker 42 is provided for the first rotation shaft 38. The first beater 31 is connected to the rocker 42 by means of a beater rod 43. In addition, the rocker 42 is connected to the first foot board 33 by means of a step force transmission member 44. On the other hand, a rocker 46 is provided for the second rotation shaft 39. The second beater 32 is connected to the rocker 46 by means of a beater rod 47. Return springs 48, 49 are provided outside of the support members 35B. Those springs give restoration behavior to the first and second rotation shafts 38, 39 in such a way that each rotation shaft is forced to rotate in a direction to restore an initial state.

Next, the second pedal frame 36 has two support members 36B which project upwardly from upper faces of both ends of a frame body 36A. Bearing portions 50 are provided at upper end portions of the support members 36B so as to rotatably support a rotation shaft 51. A rocker 52 is provided for the rotation shaft 51. The rocker 52 is connected to the second foot board 34 by means of a step force transmission member 53. The rotation shaft 51 is linked to the second rotation shaft 39 by means of a rotation transmission member 55 including a universal joint 54. Lower ends of the bearing portions 50 are linked together by a spacing member 56. Like the aforementioned embodiment (see FIG. 2), cutting channels (not shown) are provided for the rockers 42 and 52 respectively. The cutting channels are provided to avoid contact between the rockers 42, 52 and the spacing members 41, 56.

In the two-throw foot pedal 30 whose construction is described above in conjunction with FIG. 3, when a person performs a step operation on the first foot board 33 to lower the step force transmission member 44, the first rotation shaft 38 rotates against spring force of the return spring 48. So, the first beater 31 strikes a drum head of a bass drum 21. On the other hand, when the person performs a step operation on the second foot board 34 so as to rotate the rotation shaft 51, rotation of the rotation shaft 51 is transmitted to the second rotation shaft 39 by means of the rotation transmission member 55. So, the second rotation shaft 39 rotates against spring force of the return spring 49. Thus, the second beater 32 strikes the drum head of the bass drum 21.

In the two-throw foot pedal 30, the upper end portions of the support members 35B of the first pedal frame 35 are linked together by the spacing member 41, whilst the upper end portions of the support members 36B of the second pedal frame 36 are linked together by the spacing member 56. Such a construction is similar to the construction of the aforementioned embodiment shown in FIGS. 1 and 2. So, it is possible to certainly avoid occurrence of flexure which occurs on the support members 35B and 36B in left and right directions in response to the step operation. As a result, it is possible to avoid axial deviations of the rotation shafts 38, 39 and 51. Thus, it is possible to improve performance of the foot pedal.

Thanks to provision of the spacing member which links lower ends of the bearing portions together beneath the rotation shaft, it is possible to increase rigidity of the pedal frame as a whole because the spacing member works to reinforce the support members. In other words, it is possible to use materials having relatively low rigidity for the rotation shaft and support members. This brings an increase of a degree of freedom for the designing of the pedal frame. In addition, it is possible to reduce weight of the pedal frame as a whole.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A foot pedal for a drum set comprising a rotation shaft equipped with a beater which strikes a drum head;

a pedal frame having two support members which rotatable support the rotation shaft;

a foot board on which a step operation is performed to rotate the rotation shaft;

a spacing member which links upper end portions of the support members together in proximity to the rotation shaft;

a rocker which fixes the beater to the rotation shaft; and a step force transmission member which links the rocker and the foot board together, wherein a cutting channel is formed to partially cut a face of the rocker which faces with the spacing member so as to avoid interference between the rocker and the spacing member.

2. A foot pedal for a drum set comprising:

a rotation shaft equipped with a beater which strikes a drum head;

a pedal frame having two support members which rotatable support the rotation shaft;

a foot board on which a step operation is performed to rotate the rotation shaft;

a spacing member which links upper end portions of the support members together in proximity to the rotation shaft;

a rocker which fixes the beater to the rotation shaft; and a step force transmission member which links the rocker and the foot board together, wherein a cutting channel is formed to partially cut a face of the rocker which faces with the spacing member so as to avoid interference between the rocker and the spacing member, and wherein the cutting channel has an arc-like shape which is formed about a center of rotation of the rocker.

3. A foot pedal for a drum set comprising:

a frame body equipped with two support members, wherein the two support members project upwardly from both ends of the frame body;

bearing portions which are provided at upper end portions of the two support members respectively;

a rotation shaft which is rotatable supported by the bearing portions;

a heel which is connected to the frame body by means of a connection member;

a foot board one end of which is fixed to the heel;

a step force transmission member to which other end of the foot board is connected;

a rocker which is fixed to a selected position of the rotation shaft, so that the rocker rotates with the rotation shaft in response to step force which is applied to the foot board and is transmitted thereto by means of the step force transmission member;

a beater which is connected to the rocker by means of a beater rod;

a spacing member which links lower ends of the bearing portions together in proximity to and beneath the rotation shaft; and the rocker having a cutting channel formed to partially cut the rocker, the cutting channel having an arc-like shape which is formed about a center of rotation of the rocker and is determined to avoid interference between the rocker and the spacing member while the rocker rotates.

4. A foot pedal for a drum set according to claim 3 further comprising restoration means which restores the rotation shaft to an initial state when the step force applied to the foot board is released.

5. A foot pedal for a drum set according to claim 3 wherein the step force transmission member is constructed by a chain.

* * * * *